O. LEE.
DITCH FILLING MACHINE.
APPLICATION FILED MAR. 3, 1920.
1,384,617.
Patented July 12, 1921.
3 SHEETS—SHEET 1.
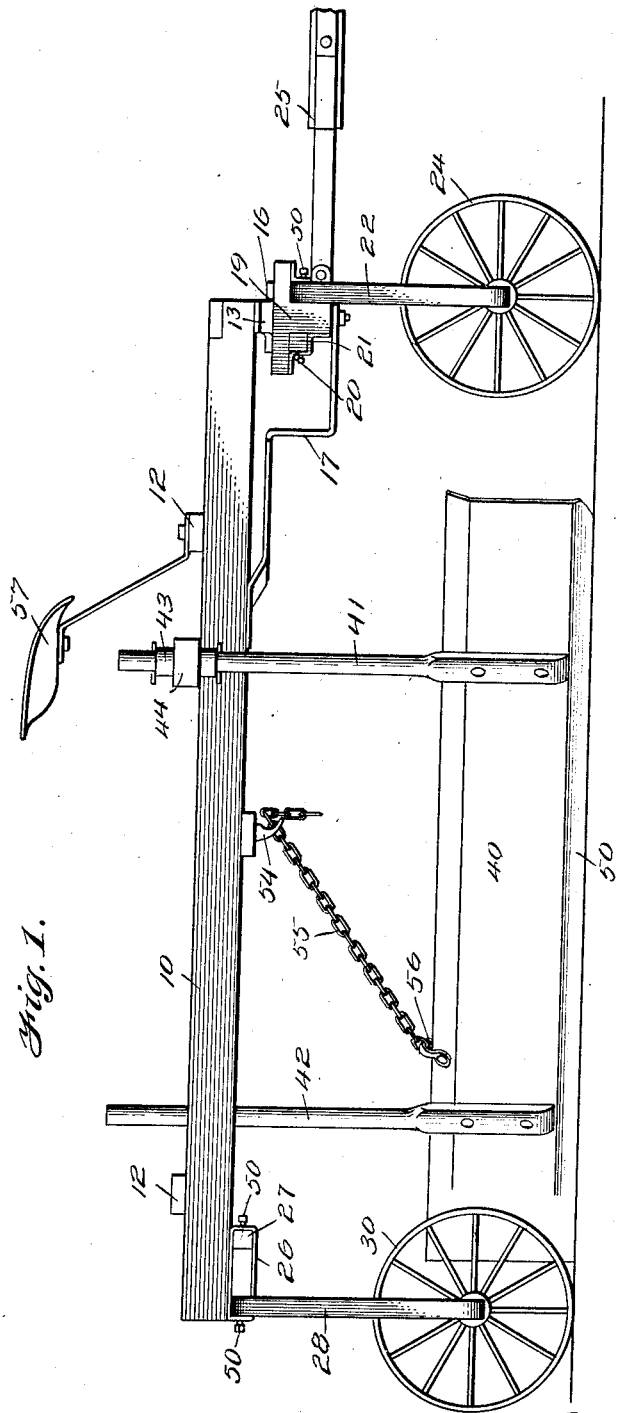
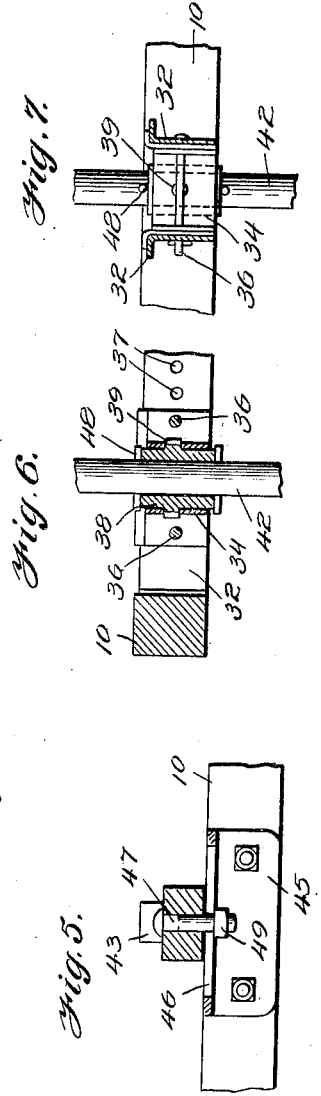
Inventor
O. Lee.
By Geo. P. Kimmel
Attorney

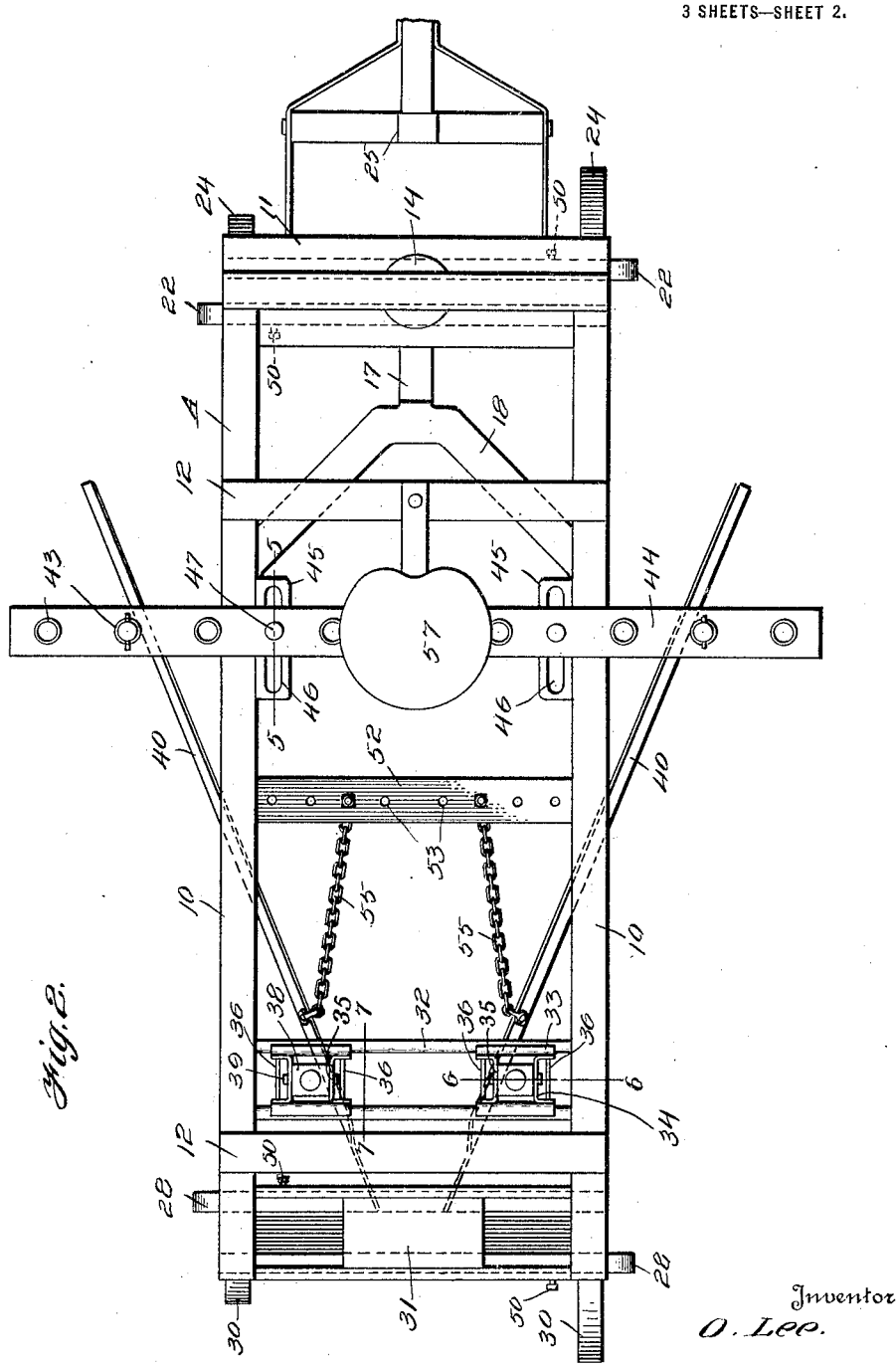

O. LEE.
DITCH FILLING MACHINE.
APPLICATION FILED MAR. 3, 1920.

1,384,617.

Patented July 12, 1921.
3 SHEETS—SHEET 3.

Inventor
O. Lee.

By Geo. P. Kimmel
Attorney

UNITED STATES PATENT OFFICE.

OSCAR LEE, OF FAIRFIELD, MONTANA.

DITCH-FILLING MACHINE.

1,384,617.  Specification of Letters Patent.  Patented July 12, 1921.

Application filed March 3, 1920. Serial No. 362,898.

*To all whom it may concern:*

Be it known that I, OSCAR LEE, a citizen of the United States, residing at Fairfield, in the county of Teton and State of Montana, have invented certain new and useful Improvements in Ditch-Filling Machines, of which the following is a specification.

The invention relates to a ground scraping machine, and more particularly to the class of ditch filling machines.

The primary object of the invention is the provision of a machine of this character, wherein the front and rear axles are adjustably mounted so that the traction wheels can be moved toward and away from each other accordingly to the positioning of the scraping blades, which are also adjustably mounted in the frame of the machine, whereby said blades can be positioned on opposite sides of a ditch for the filling thereof on the advancement of the machine, the latter being designed for filling field irrigation ditches.

Another object of the invention is the provision of a machine of this character, wherein the ground scraping blades are mounted for angular adjustment with respect to each other so as to properly deflect the dirt from the banks of a ditch into the same, without disturbing the growing crop in a field, the said blades being supported in a novel manner and are readily and easily adjusted vertically and laterally relative to the frame of the machine.

A further object of the invention is the provision of a machine of this character, which is comparatively simple in construction, thoroughly reliable and efficient in operation, strong, durable, and inexpensive to manufacture.

With these and other objects in view, the invention consists in the features of construction, combination and arrangement of parts, as will be hereinafter fully described, illustrated in the accompanying drawings and pointed out in the claims hereunto appended.

In the accompanying drawings:

Figure 1 is a side elevation of the ditch filling machine constructed in accordance with the invention.

Fig. 2 is a top plan view thereof.

Fig. 5 is a sectional view on the line 5—5 of Fig. 2.

Fig. 6 is a sectional view on the line 6—6 of Fig. 2.

Fig. 7 is a sectional view on the line 7—7 of Fig. 2.

Similar reference characters indicate corresponding parts throughout the several views in the drawings.

Figure 3:
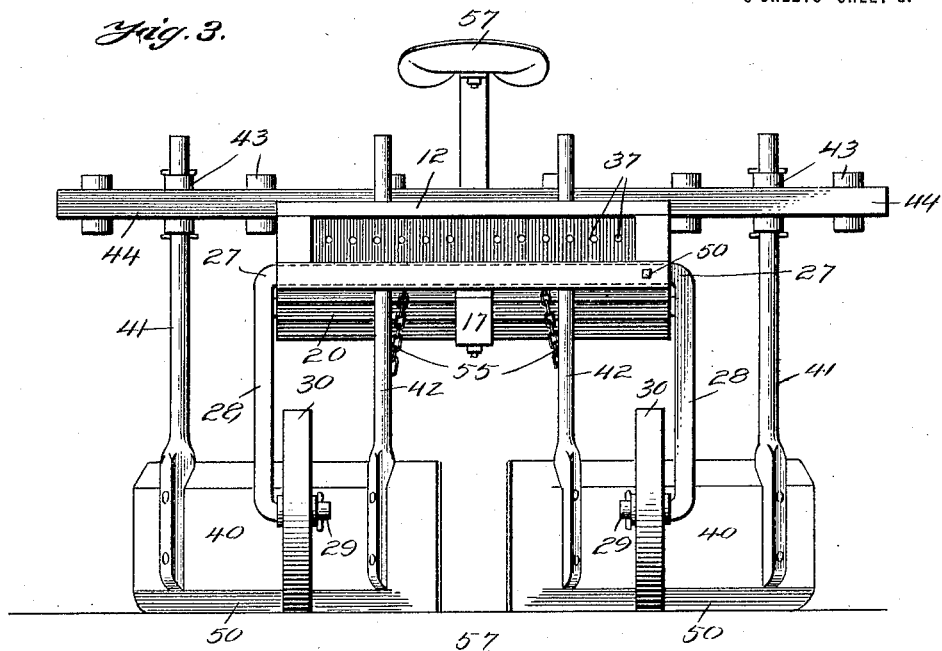
Fig. 3 is a rear elevation.
Figure 4:
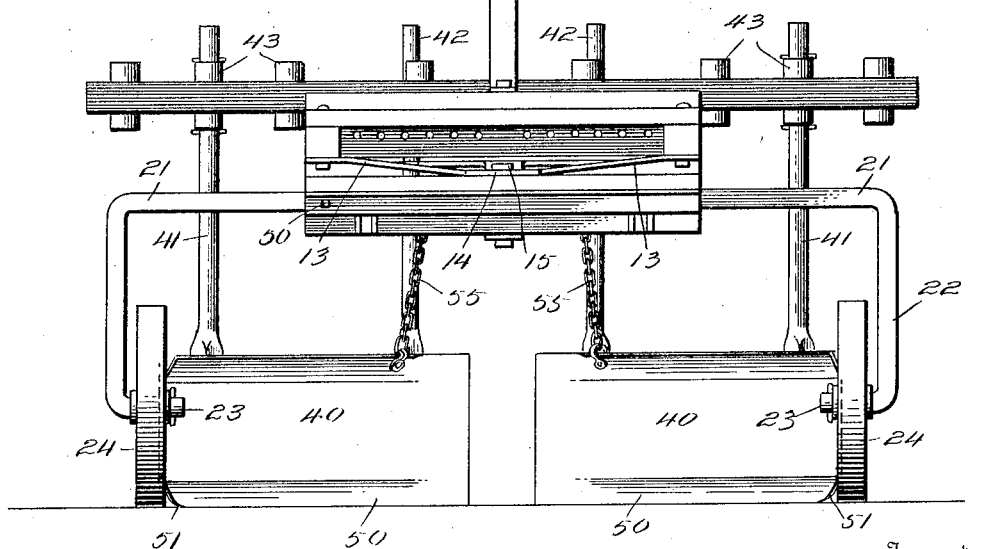
Fig. 4 is a front elevation.

Referring to the drawings in detail A designates generally the frame of the machine and includes the spaced parallel longitudinal side beams 10, front end cross beam 11 and intermediate cross braces 12, which latter are secured to the side beams 10 in any suitable manner, while the front cross beam 11 is mounted in said side beam 10 and secured thereto. Secured to the side beams 10 of the frame A beneath the front cross beam 11 is a front axle hanger 13 formed with the circular portion 14 in which is engaged the king bolt 15 for swingingly connecting to the front hanger 13 the front bolster 16, the lower end portion of the king bolt 15 being engaged in a bracket 17 which has its rearwardly divergent arms 18 fastened to the side beams 10 of the frame A and this bracket 17 rigidly supports the king bolt 15 which is detachably mounted in the hanger 13 for the removal thereof when the occasion requires.

The front bolster 16 is preferably of substantially T-shape in cross section and mounted on opposite sides of the vertical or medial portion 19 thereof are guide housings 20 which are fixed in spaced parallel relation to each other and have frictionally engaged therein slidable laterally adjustable front axle beams 21, each formed with the right angular downwardly depending standards 22 provided with the inwardly disposed axle spindles 23. The axle spindles 23 have journaled thereon the front traction wheels 24, preferably of the broad tread type.

Pivotally connected to the front bolster 16 is a draft tongue 25 for the attachment of animals to the machine, the tongue 25 being swingingly connected to the front bolster 16 in any suitable manner and is of any approved type.

Carried at the rear end of the frame A and secured to the under sides of the longitudinal side beams 10 of said frame is a stationary rear bolster 26 in which are frictionally engaged laterally adjustable slidable rear axle beams 27 which are formed with the right angular depending standards 28 provided with the inwardly disposed rear axle spindles 29 on which are journaled the rear traction wheels 30, the rear axle beams 27 being identical to the front axle beams 21 and on the adjustment of said rear axle beams 27 in the rear bolster 26 the rear traction wheels 30 can be moved toward or away from each other and likewise said traction wheels 24 can be moved toward and away from each other so as to vary the traction gage of the machine, whereby the wheels can be properly positioned to travel upon the banks of a ditch to be filled in the advancement of the machine.

Suitably mounted in the rear bolster 26 medially thereof is a friction plate which serves to frictionally hold the rear axle beams 27 in said rear bolster when said beams are adjusted relative to each other.

Secured in the frame A forwardly of the rear bolster 26 between the longitudinal side beams 10 of said frame are transversely disposed spaced parallel flanged bars 32 between which are mounted slidable bearing boxings, each including the flanged runners or slide plates 33 and the end plates 34 and 35 respectively, the plate 34 being fixed to the plates 33, while the plate 35 is removable and is detachably secured in place through the medium of a cross pin 36 adapted for engagement in any of the pairs of registering holes 37 formed in the channel bars 32, the pairs of holes 37 being spaced apart at the desired intervals from each other. The pin 36 not only fastens the plate 35 between the plates 33 but also fastens the adjustable boxing in adjusted position between the flanged bars 32. Engaged in the adjustable boxing are rocking bearings 38, each being formed with opposed trunnions 39 pivotally engaged in the plates 34 and 35 medially thereof and in this manner the said bearings 38 are swingingly supported in said boxing.

Located on opposite sides of the center line of draft of the machine are scraper blades 40 which are disposed angularly with respect to each other in a forwardly divergent relation to one another and have fixed thereto front and rear vertical posts or uprights 41 and 42 respectively constituting hangers, the forward post 41 being fitted for vertical adjustment in selected pairs of tubular sockets 43 vertically mounted in spaced relation to each other in an adjustable front cross beam 44 superimposed upon the frame A and disposed transversely thereof. The side beams 10 of the frame A carry longitudinally slotted brackets 45 the slots 46 of which receive therein pins 47 carried by the beam 44, which serve to guide said beam 44 longitudinally of the frame A when the scraper blades 40 are adjusted relative to each other.

The rear vertical posts or uprights 42 of the scrapers 40 are mounted for vertical adjustment in the bearings 38. The posts or uprights 41 and 42 are secured in adjusted position in the tubular sockets 43 and in the bearings 38 through the medium of keys 48 which are removably fitted transversely in said uprights 41 and 42 above and below the bearings 38 and tubular sockets 43 as is clearly shown in Figs. 6 and 7 of the drawings. The pins 47 are in the form of bolts each carrying a nut 49 for the fastening thereof in the slots 46 of the bracket 45 and in this manner the front beam 44 is secured in adjusted position in the brackets 45 carried by the frame A of the machine.

Each scraper blade 40 is formed with the inwardly disposed angularly cutting edge 50 which extends a major portion of the length thereof and the front corner of this edge is rounded as at 51 while the rear corner of said blade 40 is squared. The disposition of the blades 40 on the advancement of the machine draws the dirt from the opposite sides of said machine toward the center thereof for the deposit of the dirt into a ditch for the filling thereof.

Mounted on the frame A at an intermediate point thereof is a cross rail 52 having a series of spaced holes 53 for adjustably receiving claw like attaching devices 54 in each of which is adjustably engaged a draw chain 55 coupled at 56 to its respective scraper blade 40 as is clearly shown in Fig. 1 of the drawings.

Mounted on the forward cross brace 12 of the frame A medially thereof is a driver's seat 57 to be occupied by the operator of the machine, the seat 57 being of the conventional form.

In the operation of the machine the front axle beams 21 and 27 are adjusted laterally in the bolsters 16 and 26 accordingly to the desired traction gage, whereby the traction wheels 24 and 30 will travel on opposite banks of a ditch to be filled with dirt and thereafter the scraper blades 40 and vertically adjusted accordingly to the width of the ditch and to the desired cutting action thereof upon the ground. Now as the machine is advanced the dirt is drawn from the banks of the ditch at opposite sides of the machine toward the center thereof and deposited within the ditch for the filling of the same.

The guide housing 20 and stationary rear bolster 26 have threaded therein adjusting screws 50, which serve to fasten the laterally extending beams 21 and 27 of the front and rear axles respectively to hold the same in adjusted position.

From the foregoing it is believed that the construction and manner of operation of the machine will be clearly understood and therefore a more extended explanation has been omitted.

What is claimed is:

1. A machine of the character described comprising a frame, a front hanger carried at the forward end of the frame, a front turning bolster pivotally connected with the hanger, a rear stationary bolster on the rear end of the frame, axle beams mounted in the bolsters and laterally adjustable, depending uprights on said axle beams, inwardly extending axle spindles on said uprights, traction wheels journaled upon the spindles, scraper blades disposed beneath the frame on opposite sides of its center line of draft, front and rear posts on said blades, a front cross beam upon the frame and adjustably connected therewith and having a series of tubular sockets for adjustably receiving the front posts of said scraper blades, bearings mounted in the rear portion of the frame and supported for lateral adjustment, and adjustably receiving the rear posts of said scraper blades, means carried by the posts for adjustably securing the same in the sockets and bearings respectively, draw chains adjustably carried by the frame and connected with the scraper blades, flanged bars arranged on opposite sides of the bearings and fixed in spaced parallel relation to each other between the sides of the frame transversely thereof, and slidable boxings mounted between the flanged bars and supporting said bearings.

2. A machine of the character described comprising a frame, a front hanger carried at the forward end of the frame, a front turning bolster pivotally connected with the hanger, a rear stationary bolster on the rear end of the frame, axle beams mounted in the bolsters and laterally adjustable, depending uprights on said axle beams, inwardly extending axle spindles on said uprights, traction wheels journaled upon the spindles, scraper blades disposed beneath the frame on opposite sides of its center line of draft, front and rear posts on said blades, a front cross beam upon the frame and adjustably connected therewith and having a series of tubular sockets for adjustably receiving the front posts of said scraper blades, bearings mounted in the rear portion of the frame and supported for lateral adjustment, and adjustably receiving the rear posts of said scraper blades, means carried by the posts for adjustably securing the same in the sockets and bearings respectively, draw chains adjustably carried by the frame and connected with the scraper blades, flanged bars arranged on opposite sides of the bearings and fixed in spaced parallel relation to each other between the sides of the frame transversely thereof, slidable boxings mounted between the flanged bars and supporting said bearings, and means adjustably securing the cross beam to the frame.

3. A machine of the character described comprising a frame, a front hanger carried at the forward end of the frame, a front turning bolster pivotally connected with the hanger, a rear stationary bolster on the rear end of the frame, axle beams mounted in the bolsters and laterally adjustable, depending uprights on said axle beams, inwardly extending axle spindles on said uprights, traction wheels journaled upon the spindles, scraper blades disposed beneath the frame on opposite sides of its center line of draft, front and rear posts on said blades, a front cross beam upon the frame and adjustably connected therewith and having a series of tubular sockets for adjustably receiving the front posts of said scraper blades, bearings mounted in the rear portion of the frame and supported for lateral adjustment, and adjustably receiving the rear posts of said scraper blades, means carried by the posts for adjustably securing the same in the sockets and bearings respectively, draw chains adjustably carried by the frame and connected with the scraper blades, flanged bars arranged on opposite sides of the bearings and fixed in spaced parallel relation to each other between the sides of the frame transversely thereof, slidable boxings mounted between the flanged bars and supporting said bearings, means adjustably securing the cross beam to the frame, and inwardly directed angular scraping edges formed on the scraper blades for a major portion of the length thereof and having rounded front corners.

In testimony whereof, I affix my signature hereto.

OSCAR LEE.